(12) United States Patent
Wan et al.

(10) Patent No.: US 8,087,080 B1
(45) Date of Patent: Dec. 27, 2011

(54) INSPECTION OF DOWNLOADABLE CONTENTS FOR MALICIOUS CODES

(75) Inventors: Xiaochuan Wan, Jiangsu (CN);
Xiaodong Huang, Jiangsu (CN);
Zhengmao Lin, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 541 days.

(21) Appl. No.: 12/253,534

(22) Filed: Oct. 17, 2008

(51) Int. Cl.
*G06F 11/00* (2006.01)
*G06F 7/10* (2006.01)

(52) U.S. Cl. ............... 726/22; 726/23; 726/24; 726/25; 707/4

(58) Field of Classification Search ............ 726/24, 726/22, 23, 25; 707/4
See application file for complete search history.

(56) References Cited

U.S. PATENT DOCUMENTS

| 2003/0132967 A1* | 7/2003 | Gangadharan | 345/769 |
| 2006/0101514 A1* | 5/2006 | Milener et al. | 726/22 |
| 2010/0057701 A1* | 3/2010 | Engel et al. | 707/4 |

OTHER PUBLICATIONS

Snap.com: Delivering Contextual Content and Advertising, 1 sheet; Webpage [online] [retrieved on Sep. 17, 2008]. Retrieved from the internet: http://www.snap.com/snapshots.php.
Web widget—From Wikipedia, the free encyclopedia, 2 sheets [retrieved on Sep. 17, 2008]. Retrieved from the internet: http://www.en.wikipedia.org/wiki/Web_widget.
Web 2.0 Expo: All Things Widgets—ReadWriteWeb, 3 sheets [retrieved on Sep. 17, 2008]. Retrieved from the internet: http://www.readwriteweb.com/archives/web_20_expo_all_things_widgets.php.
Widgets for Web 2.0—All about Web Widgets, popular articles, blogs, screen casts and demo videos, 11 sheets [retrieved on Sep. 17, 2008]. Retrieved from the internet: http://www.widgets-gadgets.com/.

* cited by examiner

*Primary Examiner* — Philip Lee
(74) *Attorney, Agent, or Firm* — Okamoto & Benedicto LLP

(57) ABSTRACT

A web page available for download from a web server computer may include a reference to a web widget. When the web page is received in a client computer, the reference executes and retrieves the web widget from a security server computer. The web widget may be configured to detect when a cursor in the client computer is pointed to a link displayed on the web page. The web widget may communicate with a remotely located computer to determine if the link points to a downloadable file that contains malicious code. The web widget may display a warning message to alert a user of the client computer when the downloadable file contains malicious code.

18 Claims, 5 Drawing Sheets

INSPECTION OF DOWNLOADABLE CONTENTS FOR MALICIOUS CODES

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

1. Field of the Invention

The present invention relates generally to computer security, and more particularly but not exclusively to inspection of downloadable contents for malicious code.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to herein as "viruses." Malicious codes have become so prevalent that experienced computer users have some form of antivirus in their computers. Antivirus products for scanning data for malicious codes are commercially available from several vendors, including Trend Micro, Inc.

Downloadable files are widely available on the Internet. While easy access to downloadable files has obvious advantages, it does not come without a price. More specifically, downloadable files may contain malicious codes. This situation is especially problematic with client computers that have no local antivirus.

SUMMARY

A web page available for download from a web server computer may include a reference to a web widget. When the web page is received in a client computer, the reference executes and retrieves the web widget from a security server computer. The web widget may be configured to detect when a cursor in the client computer is pointed to a link displayed on the web page. The web widget may communicate with a remotely located computer to determine if the link points to a downloadable file that contains malicious code. The web widget may display a warning message to alert a user of the client computer when the downloadable file contains malicious code.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
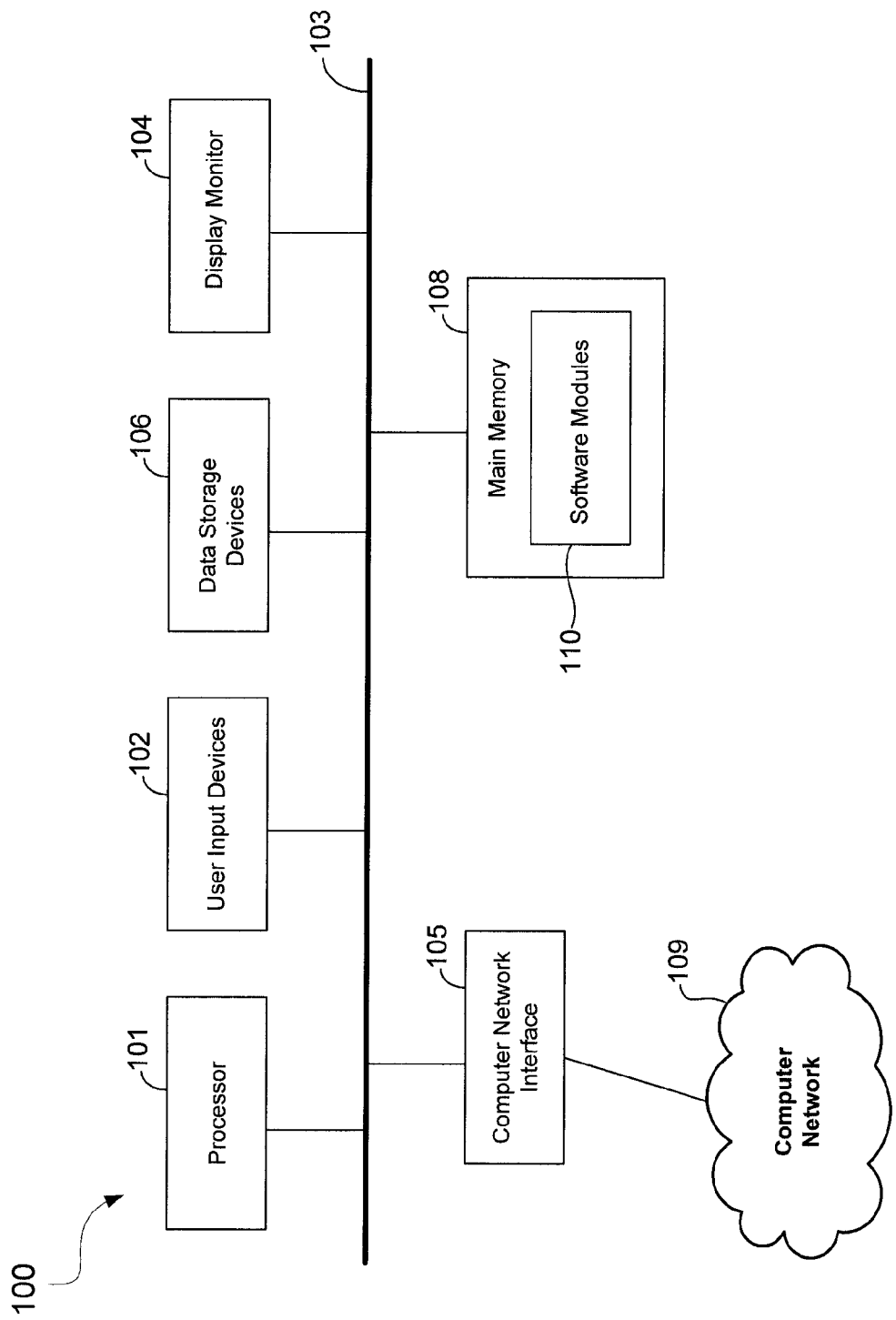
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client computer 210, a security server computer 220, or a web server computer 240 shown in FIG. 2, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may comprise computer-readable program code components of the client computer 210, the security server computer 220, or the web server computer 240, for example. The software modules 110 may be loaded from the data storage device 106 to the main memory 108 for execution by the processor 101.

Figure 2:
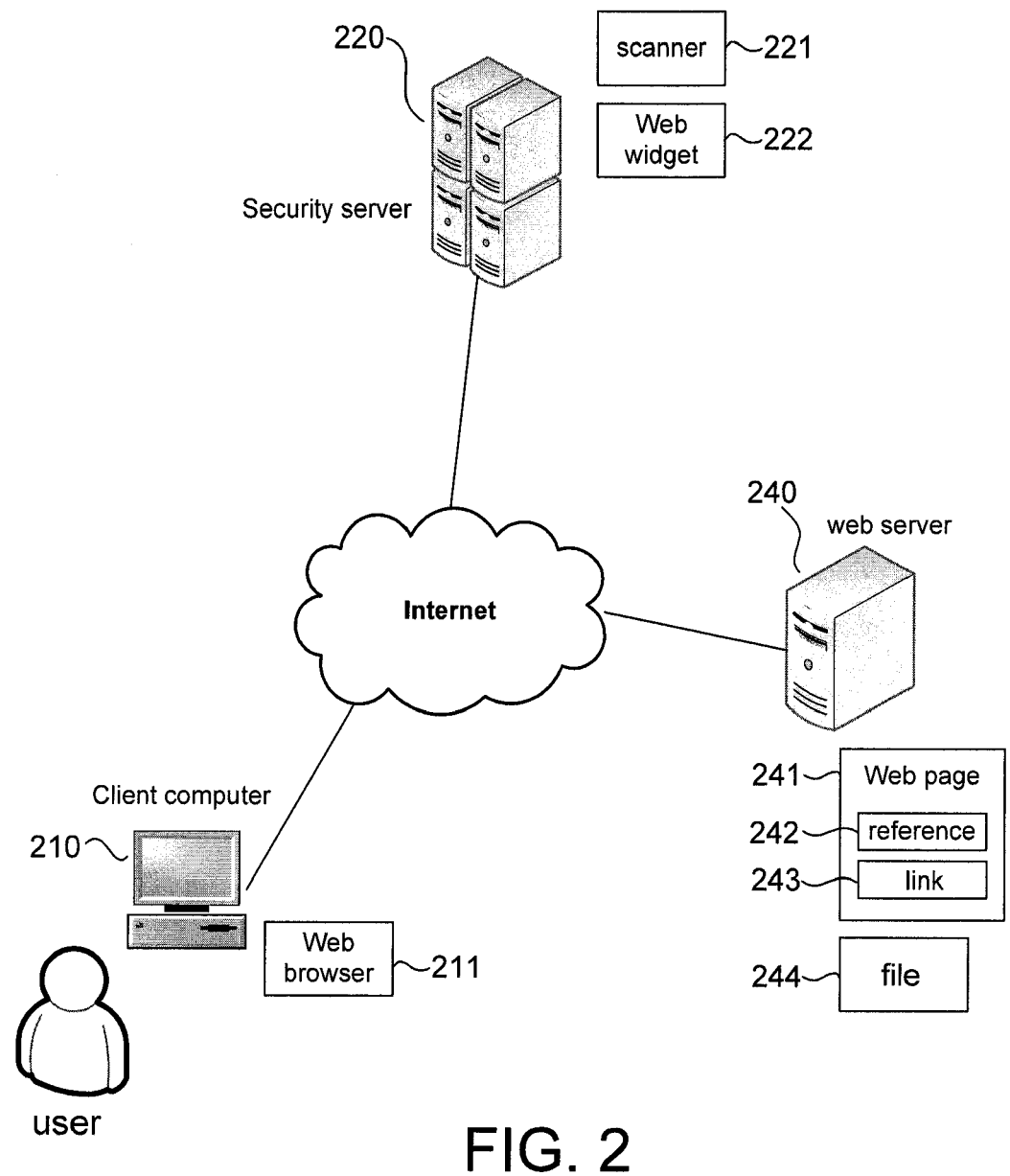
FIG. 2 shows a system for inspecting downloadable content for malicious codes in accordance with an embodiment of the present invention.

FIG. 2 shows a system for inspecting downloadable content for malicious codes in accordance with an embodiment of the present invention. In the example of FIG. 2, the system includes the client computer 210, the security server computer 220, and the web server computer 240. There may be one or more client computers 210, security server computers 220, and web server computers 240 in any given system but only one of each is shown herein for clarity of illustration. The client computer 210, the security server computer 220, and the web server computer 240 may communicate over a computer network, which in this example is over the Internet.

The client computer 210 may comprise a computer typically employed by a user to visit websites on the Internet. For example, the client computer 210 may comprise a desktop, a notebook, or a portable computing device. The client computer 210 may comprise a web browser 211, such as the Microsoft Internet Explorer™ web browser.

The security server computer 220 may comprise a server computer configured to provide malicious code detection services. In one embodiment, the security server computer 220 is configured to deploy a scanning agent in the form of a web widget 222 to the client computer 210 to facilitate inspection of downloadable content, such as a computer file, for malicious code. The security server computer 220 may determine if a file contains malicious code prior to the user downloading the file into the client computer 210. This advantageously protects the client computer 210 from infected downloadable files without the client computer 210 having its own antivirus to scan downloadable files locally.

The security server computer 220 may comprise a scanner 221 and the web widget 222. The scanner 221 may comprise an antivirus for scanning files (or other data units) for malicious codes. In one embodiment, the scanner 221 comprises computer-readable program code configured to scan downloadable files having a link pointed to by a cursor of the client computer 210. The scanner 221 may be implemented using conventional antivirus algorithms. For example, the scanner 221 may employ a pattern matching algorithm to scan for malicious codes. The scanner 221 may compare the contents of a file to patterns of known malicious codes to determine if the file contains malicious code.

The web widget 222 serves as a scanning agent to allow the security server computer 220 to detect downloadable content that the user may receive into the client computer 210. In one embodiment, the web widget 222 comprises computer-readable program code configured to detect when the user points a cursor to a link of a downloadable file. This advantageously allows for a simple, easy to use antivirus interface. Compared to having the user go through cumbersome menus and actions to determine if a downloadable file that is yet to be received in the client computer contains malicious code, simply having the user point the cursor to the link of the downloadable file allows for a relatively simple and transparent (the user may need to click on the link anyways) procedure.

The web widget 222 may be implemented in a variety of programming languages, but is written in the Java programming language in one embodiment. Generally speaking, a web widget, such as the web widget 222, is a portable chunk of computer-readable program code that may be installed and executed in an HTML (hypertext markup language) web page without additional compilation. The web widget 222 may be configured to be downloaded from the security server computer 220 to the client computer 210 when a web page with a reference to the web widget 222 is received in the client computer 210.

The web server computer 240 may comprise a server computer hosting a website having one or more web pages 241. In one embodiment, the web server computer 240 hosts a website that provides downloadable content in the form of downloadable files, such as a file 244. There may be more than one file 244 available for download from the web server computer 240 but only one is shown in FIG. 2 for clarity of illustration.

A web page 241 may include a reference 242 and one or more links 243. Each link 243 may be linked to a file 244. A link 243 may include the address (e.g., URL) of the corresponding file 244. When the web page 241 is rendered in the client computer 210, the user may activate a link 243 (e.g., by clicking using a mouse or other pointing device) to download the corresponding file 244 from the web server computer 240 to the client computer 210. In practice, the file 243 may be hosted in a computer (e.g., separate file server) other than the web server computer 240. The link 243 may include an address for directly or indirectly retrieving the corresponding file 244 from wherever it is stored.

The reference 241 may comprise computer-readable program code for downloading the web widget 222 to the client computer where the web page 241 is received. In the example of FIG. 2, the reference 241 is configured to retrieve the web widget 222 from the security server computer 220 to the client computer 210 when the web page 241 is received in the client computer 210.

Figure 3:
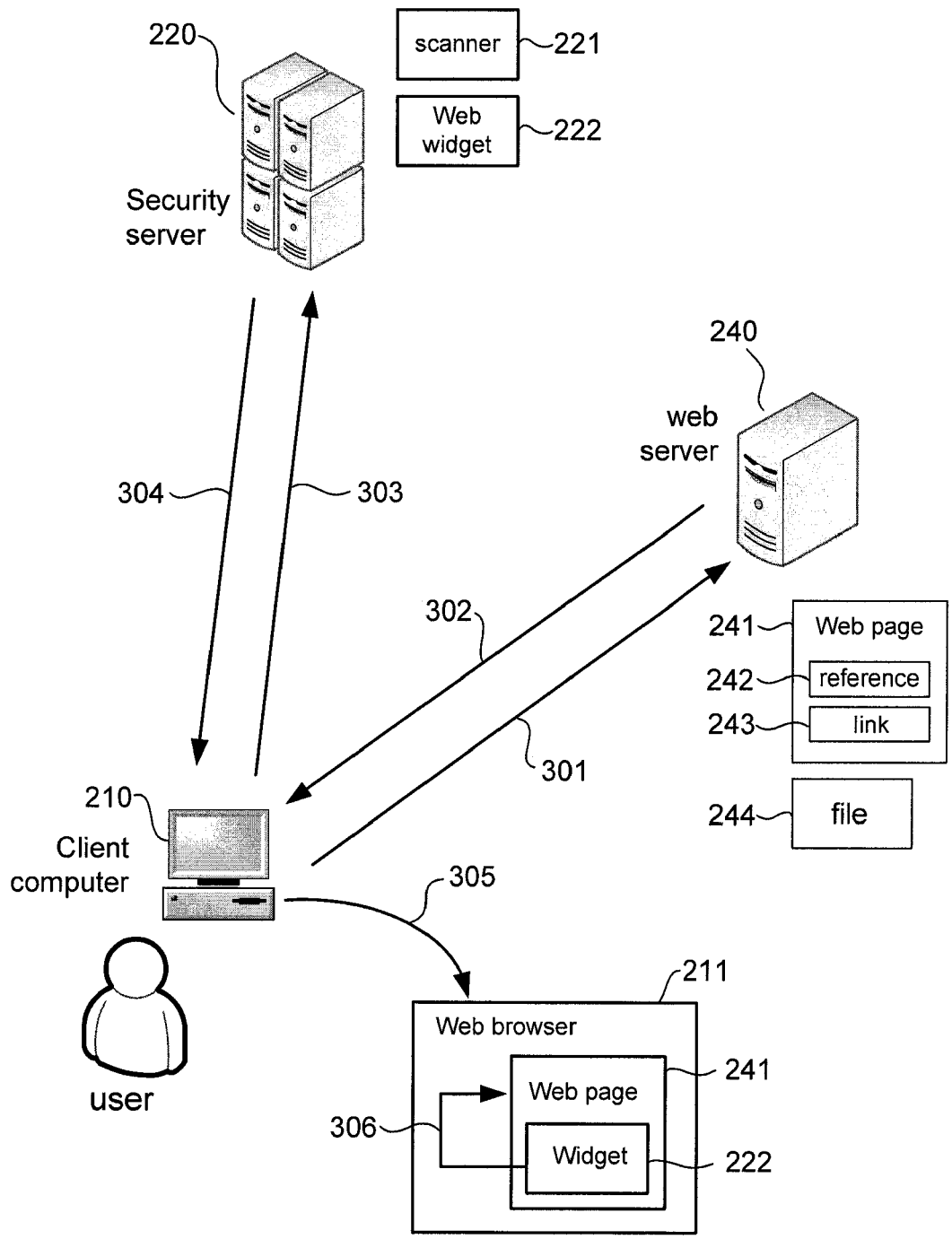
FIGS. 3 and 4 show flow diagrams schematically illustrating inspection of downloadable content for malicious codes in accordance with an embodiment of the present invention.
Figure 4:
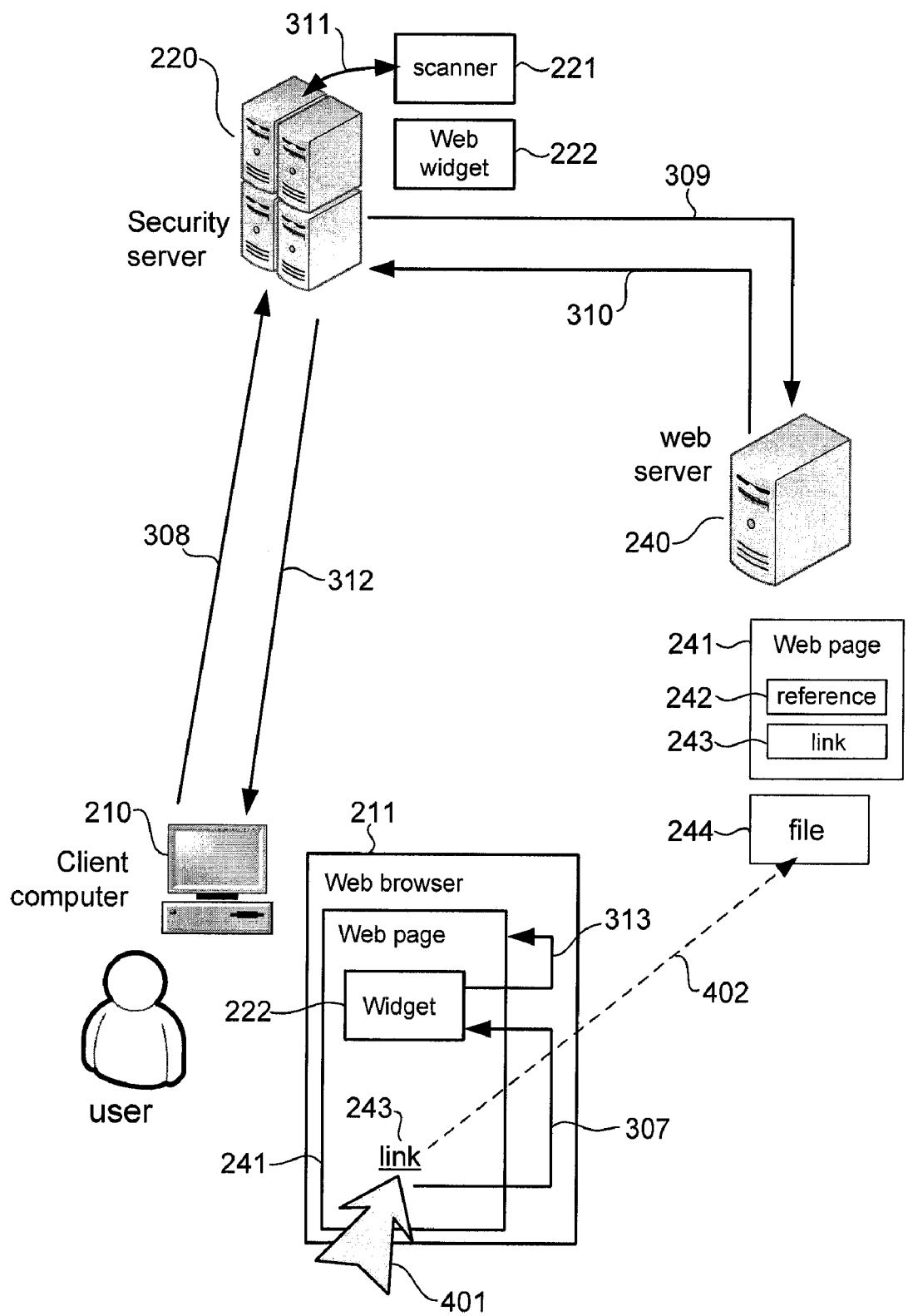

FIGS. 3 and 4 show flow diagrams schematically illustrating inspection of downloadable content for malicious codes in accordance with an embodiment of the present invention. The flow diagrams of FIGS. 3 and 4 are explained using the system of FIG. 2 as an example.

The user of the client computer 210 uses the web browser 211 to navigate to the web page 241 of a website hosted by the web server computer 240 (arrow 301). This results in the web browser 211 issuing an HTTP GET command to request the web page 241 from the web server computer 240. When the web page 241 is received in the client computer 210 (arrow 302), the reference 242 executes and sends a request to retrieve the web widget 222 from the security server computer 220 (arrow 303). For example, assuming the URL (uniform resource locator) of the security server computer 220 is "www.trendmicro.com" and the URL of the web widget 222 is:

http://www.trendmicro.com/webwidget/widget.js the reference 242 to retrieve the web widget 222 may comprise:

<script type="text/javascript"
src="http://www.trendmicro.com/webwidget/widget.js"></script>

The security server computer 220 provides the web widget 222 to the client computer 210 (arrow 304). The web browser 211 renders the web page 241 (arrow 305), thereby executing the web widget 222 in the client computer 210. When executed, the web widget 222 installs hooks in the web page 241 to detect when the user moves the cursor of a pointing device (e.g., mouse, trackball, pen and tablet) to a link of a downloadable content (arrow 306). In the example of FIGS. 3 and 4, the web widget 222 comprises computer-readable program code for detecting when the user points a mouse cursor to a link 243 on the web page 241.

The web widget 222 may be implemented using the Java programming language. The web widget 222 may be configured to parse the web page 241 to find and install a hook to each link 243 on the web page 241. For example, the web widget 222 may have the following logic:

//parse the HTML to get each link, for each link
//hook mouse hover and mouse out events
link[i]attachEvent("onmouseover", WebScan_go);
link[i]attachEvent("onmouseout", WebScan_co);

where "WebScan" initiates malicious code inspection, which involves the security server computer 220 scanning the file 244 linked by the link 243 for malicious code.

Continuing in FIG. 4, the web widget 222 detects the mouser cursor 401 point to a link 243 (see dashed line 402) on the web page 241 (arrow 307). If the user were to click on the link 243, the file 244 would be downloaded to the client computer 210 from the web server computer 240 (or wherever the file 244 is stored). In this case, the pointing of the cursor 401 on the link 243 is intercepted by the web widget 222, which then initiates inspection of the file 244 for malicious code. In one embodiment, the web widget 222 is configured to get the link 243 and pass the link 243 to the security server computer 220, and receive an indication from the security server computer 220 whether or not the file 244 linked to the link 243 contains malicious code. For example, the web widget 222 may include the following logic:

Function WebScan_go(e) {
//get the current link
var link=window.document.all!=null? e.srcElement:e.target;
//Send the link to the web service to Trend Micro using AJAX
. . .
//Display the information if the scanned file is malicious.

where the WebScan_go function is called when the cursor 401 is over the link 243. To prevent the user from downloading the file 244 before it has been inspected for malicious codes, the web widget 222 may display a message informing the user to wait while the file 244 is being inspected or may prevent activation of the link 243 until the file 244 is verified as clean. As another option, the web widget 222 may also be configured to inspect the file 244 asynchronously in the background and not display a message to the user or otherwise interfere with user operation unless the file 244 contains malicious code.

The web widget 222 responds to the pointing of the cursor 401 to the link 243 by providing the link 243 to the security server computer 220 (arrow 308). The security server computer 220 uses the link 243 to request the file 244 from the web server computer 240 (arrow 309). In response, the web server computer 240 provides the file 244 to the security server computer 220 (arrow 310). There, the scanner 221 scans the file 244 for malicious codes (arrow 311). The security server computer 220 provides the result of the scanning to the web widget 222 in the client computer 210 (arrow 312).

In the client computer 210, the web widget 222 checks the result of the scanning to determine whether or not the file 244 contains malicious codes. If the result of the scanning indicates that the file 244 is clean (i.e., does not contain malicious codes), the web widget 222 may allow activation of the link 243. In addition, if the file 244 is clean, the web widget 222 may display a message telling the user that the file 244 is safe to download. This advantageously gives the user a peace of mind.

Figure 5:
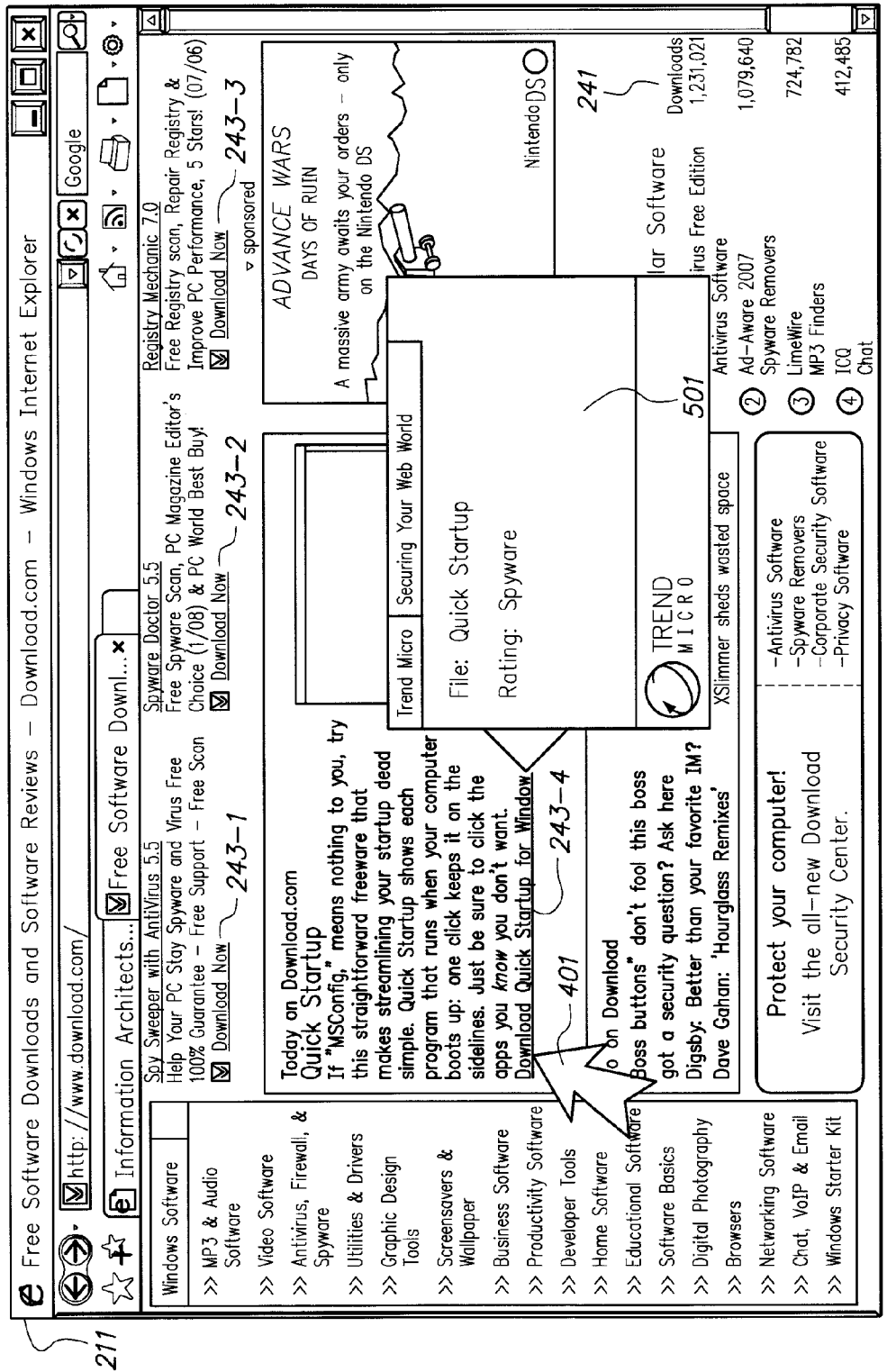
FIG. 5 shows an example warning message that may be displayed by a web widget in accordance with an embodiment of the present invention.

On the other hand, if the result of the scanning indicates that the file 244 contains malicious code, the web widget 222 may display a message warning the user not to activate the link 243 because the file 244 contains malicious code. The warning may be displayed on a small browser window near the link 243 over the web page 241. FIG. 5 shows an example warning message 501 that may be displayed by the web widget 222 in accordance with an embodiment of the present invention.

In the example of FIG. 5, the web page 241 is displayed on a window of the web browser 211. The web page 241 is for a software download site in this example. Accordingly, the web page 241 includes a plurality of links 243 (i.e., 243-1, 243-2, 243-3, and 243-4), each of which is a link to a corresponding downloadable file. The pointing of the cursor 401 on the link 243-4 initiates the determination of whether the downloadable file linked by the link 243-4 contains malicious code. In this example, the link 243-4 is to a downloadable file that contains spyware. Accordingly, the web widget 222 displays the warning message 501 to alert the user. In the example of FIG. 5, the warning message 501 is displayed over the web page in the vicinity of the link 243-4.

As can be appreciated, embodiments of the present invention provide advantages heretofore unrealized. For one, embodiments of the present invention protect client computers from malicious codes originating from downloadable contents even without having a local antivirus. Secondly, embodiments of the present invention are relatively simple to implement, requiring a single line of code in a web page. This makes the solution very desirable to website operators who do not perform their own malicious code screening. Thirdly, the provider of the malicious code detection service may use these embodiments as an additional revenue source. For example, advertisements may be included in messages displayed by the web widget 222. Fourthly, embodiments of the present invention allow for inspection of downloadable content in the background without the downloadable content being received in the client computer prior to inspection and without having to perform cumbersome configuration on the client computer or on the website providing the downloadable content.

Systems and methods for inspecting downloadable content for malicious code have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of inspecting downloadable content for malicious codes, the method comprising:
   receiving a web page in a client computer, the web page including a reference to a web widget;
   automatically downloading the web widget over a computer network into the client computer using the reference when the web page is received in the client computer;
   the web widget automatically executing in the client computer to install hooks in the web page to detect a mouse cursor pointed to a link on the web page, the link being to a downloadable file available from a first server computer remotely located from the client computer;
   responding to the detection of the mouse cursor pointed to the link by inspecting the downloadable file for malicious code in a second server computer remotely located from the client computer, the second server computer being different from the first server computer; and
   displaying a warning message in the client computer when the inspection of the downloadable file in the second server computer indicates that the downloadable file contains malicious code.

2. The method of claim 1 wherein the web widget is used to initiate the inspection of the downloadable file for malicious code in the second server computer, and to display the warning message in the client computer.

3. The method of claim 1 wherein inspecting the downloadable file for malicious code in the second server computer comprises:
   the web widget providing an address of the downloadable file to the second server computer;
   downloading the downloadable file from the first server computer into the second server computer using the address of the downloadable file provided by the web widget;
   scanning the downloadable file for malicious code in the second server computer; and
   providing a result of the scanning from the second server computer to the client computer.

4. The method of claim 1 wherein the warning message is displayed by the web widget.

5. The method of claim 1 wherein the warning message is displayed over the web page in the vicinity of the link.

6. The method of claim 1 wherein the link is one of a plurality of links displayed by the web page, each link being to a corresponding downloadable file.

7. The method of claim 1 wherein the downloadable file is inspected for presence of spyware.

8. A system for inspecting downloadable content for malicious codes, the system comprising:
a web server computer comprises memory configured to store a web page for download to a client computer, the web page including a link to a downloadable file and a reference to a web widget; and
a security server computer configured to store the web widget, the security server computer being configured to automatically provide the web widget to the client computer using the reference when the web page is received in the client computer, the web widget being configured to automatically execute in the client computer to initiate inspection of the downloadable file for malicious code by installing hooks in the web page to detect a mouse cursor in the client computer being pointed to the link on the web page, the web widget being further configured to display a result of the inspection in a warning message displayed over the web page.

9. The system of claim 8 wherein the web widget is configured to parse the web page for the link and to provide the link to the security server computer upon detection of the mouse cursor being pointed to the link.

10. The system of claim 8 wherein the link is one of a plurality of links on the web page, each link in the plurality of links being to a corresponding downloadable file.

11. The system of claim 8 wherein the downloadable file is stored in a server computer that is separate from the web server computer.

12. The system of claim 8 wherein the web widget is configured to initiate the inspection of the downloadable file for malicious code by parsing the web page for the link and forwarding the link from the client computer to the security server computer.

13. The system of claim 12 wherein the security server computer is configured to receive the link from the web widget in the client computer, to use the link to retrieve the downloadable file from a remotely located computer, to scan the downloadable file for malicious code in the security server computer, and to provide a result of the scanning of the downloadable file to the web widget in the client computer.

14. A method of inspecting downloadable contents for malicious codes, the method comprising:
receiving a web page having a reference to a web widget in a client computer;
automatically downloading the web widget into in the client computer upon receiving the web page in the client computer, the web widget being downloaded by the client computer from a first server computer as a result of the reference being automatically executed in the client computer; wherein the web widget automatically executing in the client computer to install hooks in the web page;
using the hooks to detect a mouse cursor pointed to a link to a downloadable file, the link being one of a plurality of links on the web page; and
using the web widget to display a warning message in the client computer when the downloadable file contains malicious code.

15. The method of claim 14 wherein the web widget is configured to parse the web page for the link, to transmit the link over a computer network to determine if the downloadable file contains malicious code, and to receive over the computer network an indication whether or not the downloadable file contains malicious code.

16. The method of claim 14 wherein the warning message is displayed over the web page.

17. The method of claim 14 wherein the web page is served by a second server computer separate from the first server computer.

18. The method of claim 14 wherein the first server computer scans the downloadable file for malicious code and provides a result of the scanning to the web widget.

* * * * *